(12) United States Patent
Nakajo et al.

(10) Patent No.: US 7,250,622 B2
(45) Date of Patent: Jul. 31, 2007

(54) APPARATUS FOR AND METHOD OF READING AND ERASING RADIATION IMAGE INFORMATION

(75) Inventors: Masakazu Nakajo, Minami-ashigara (JP); Yasunori Ohta, Hadano (JP); Osamu Kuroda, Fujisawa (JP); Yuzuru Ohtsuka, Minami-ashigara (JP); Yoshihiro Ishikawa, Kanagawa-ken (JP); Hideki Suzuki, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 218 days.

(21) Appl. No.: 11/038,259

(22) Filed: Jan. 21, 2005

(65) Prior Publication Data

US 2005/0156126 A1 Jul. 21, 2005

(30) Foreign Application Priority Data

Jan. 21, 2004 (JP) ............................. 2004-012753
Jul. 28, 2004 (JP) ............................. 2004-220393

(51) Int. Cl.
*G01N 23/04* (2006.01)
*B65H 5/06* (2006.01)
*B65H 7/00* (2006.01)

(52) U.S. Cl. ...................... 250/588; 250/589
(58) Field of Classification Search ................. 250/588
See application file for complete search history.

(56) References Cited

U.S. PATENT DOCUMENTS 4,849,630 A * 7/1989 Fukai et al. ................ 250/588
6,339,225 B1 * 1/2002 Funabashi ................... 250/588
6,346,714 B1 * 2/2002 Mueller et al. ............. 250/589
2002/0043637 A1 * 4/2002 Furue ........................ 250/585

FOREIGN PATENT DOCUMENTS

| JP | 63-261344 A | 10/1988 |
| JP | 1-107248 A | 4/1989 |
| JP | 11-160817 A | 6/1999 |
| JP | 2002-156716 A | 5/2002 |

* cited by examiner

Primary Examiner—David Porta
Assistant Examiner—Frederick F. Rosenberger
(74) Attorney, Agent, or Firm—Sughrue Mion, PLLC

(57) ABSTRACT

After a housing of a cassette is opened by a suction cup, then a stimulable phosphor sheet is removed from the cassette by a shiftable roller and then fed in an auxiliary scanning direction by a feed mechanism. While being fed in the auxiliary scanning direction, the stimulable phosphor sheet is irradiated with a laser beam emitted from a stimulating optical system. Light emitted from the stimulable phosphor sheet upon exposure to the laser beam is guided through a light guide to a photoelectric transducer. After the recorded radiation image information is read from the stimulable phosphor sheet, the stimulable phosphor sheet is stored back into the cassette, and erasing light from erasing light sources is applied to the stimulable phosphor sheet in the cassette to erase remaining radiation image information from the stimulable phosphor sheet.

18 Claims, 15 Drawing Sheets

APPARATUS FOR AND METHOD OF READING AND ERASING RADIATION IMAGE INFORMATION

BACKGROUND OF THE INVENTION

1. Field of the Invention

The present invention relates to an apparatus for and a method of reading and erasing radiation image information by applying stimulating light to a stimulable phosphor sheet on which radiation image information has been recorded, photoelectrically reading light emitted from the stimulable phosphor sheet to acquire the recorded radiation image information therefrom, and applying erasing energy to the stimulable phosphor sheet to erase remaining radiation image information therefrom.

2. Description of the Related Art

Heretofore, there have been known radiation image information reading and erasing apparatus employing a stimulable phosphor sheet that stores part of radiation energy applied thereto and emits the stored radiation energy in response to stimulating light such as visible light applied thereto.

The radiation image information reading and erasing apparatus have a loading unit for loading a cassette which holds therein a stimulable phosphor sheet on which radiation image information of a subject such as a human body or the like has been recorded, a separating unit for separating the stimulable phosphor sheet from the cassette, a reading unit for applying stimulating light to the separated stimulable phosphor sheet to read the recorded radiation image information therefrom, and an erasing unit for applying erasing light to the stimulable phosphor sheet from which the radiation image information has been read, to erase remaining radiation image information from the stimulable phosphor sheet.

For example, Japanese Laid-Open Patent Publication No. 2002-156716 discloses a radiation image information reading and erasing apparatus having a separating unit, an erasing unit, and a reading unit that are arranged serially in the order named. A stimulable phosphor sheet separated from a cassette by the separating unit is fed through the erasing unit to the reading unit where recorded radiation image information is read from the stimulable phosphor sheet. Thereafter, remaining radiation image information is erased from the stimulable phosphor sheet while the stimulable phosphor sheet is being returned through the erasing unit to the separating unit.

For successively reading and erasing the radiation image information from the stimulable phosphor sheet within a short period of time, it is necessary to keep the reading unit and the erasing unit spaced a sufficient distance from each other or to place an appropriate light shield between the reading unit and the erasing unit so that erasing light will not leak into the reading unit.

However, when the reading unit and the erasing unit is spaced a sufficient distance from each other, the stimulable phosphor sheet tend to take a long time to travel therebetween, also making the apparatus large in size. Furthermore, since remaining radiation image information is erased from the stimulable phosphor sheet while the stimulable phosphor sheet is being fed, the apparatus needs to have a feed path length long enough to cover a maximum stimulable phosphor sheet size. If the light shield is employed, then it makes the apparatus complex in structure and expensive to manufacture.

SUMMARY OF THE INVENTION

It is a general object of the present invention to provide an apparatus for and a method of reading and erasing radiation image information from a stimulable phosphor sheet at a high speed, the apparatus being small in size and simple in structure.

A major object of the present invention is to provide an apparatus for and a method of reading and erasing radiation image information by reading the radiation image information highly accurately from a stimulable phosphor sheet that is held in a cassette which is part of a vibration isolation support mechanism.

Another object of the present invention is to provide an apparatus for and a method of reading and erasing radiation image information successively from stimulable phosphor sheets stored in a plurality of cassettes that are loaded in the apparatus without the need for an increased apparatus size.

Still another object of the present invention is to provide an apparatus for and a method of reading and erasing radiation image information by effectively erasing remaining radiation image information from a stimulable phosphor sheet stored in a cassette.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
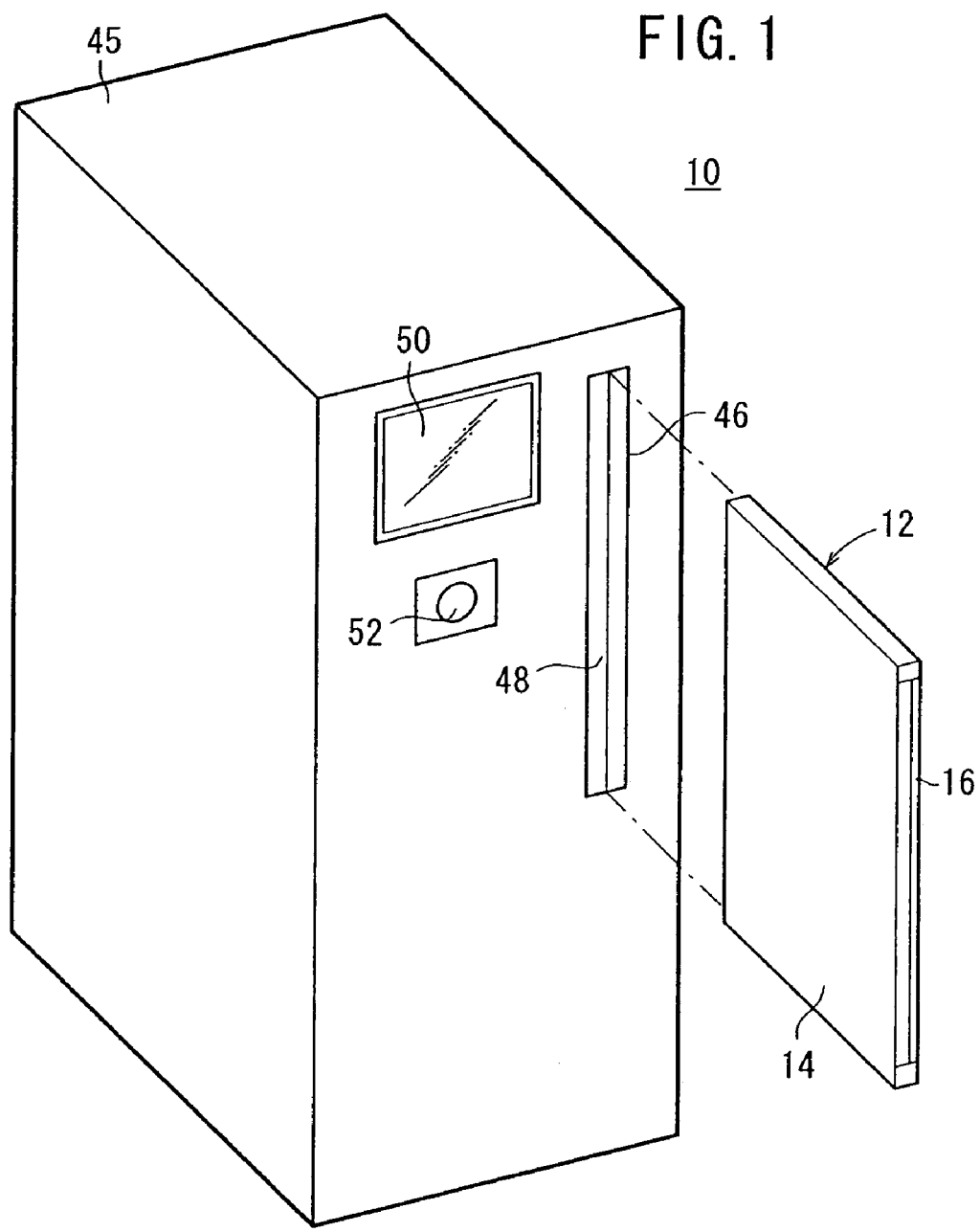
FIG. 1 is a perspective view of a radiation image information reading and erasing apparatus according to an embodiment of the present invention.
Figure 2:
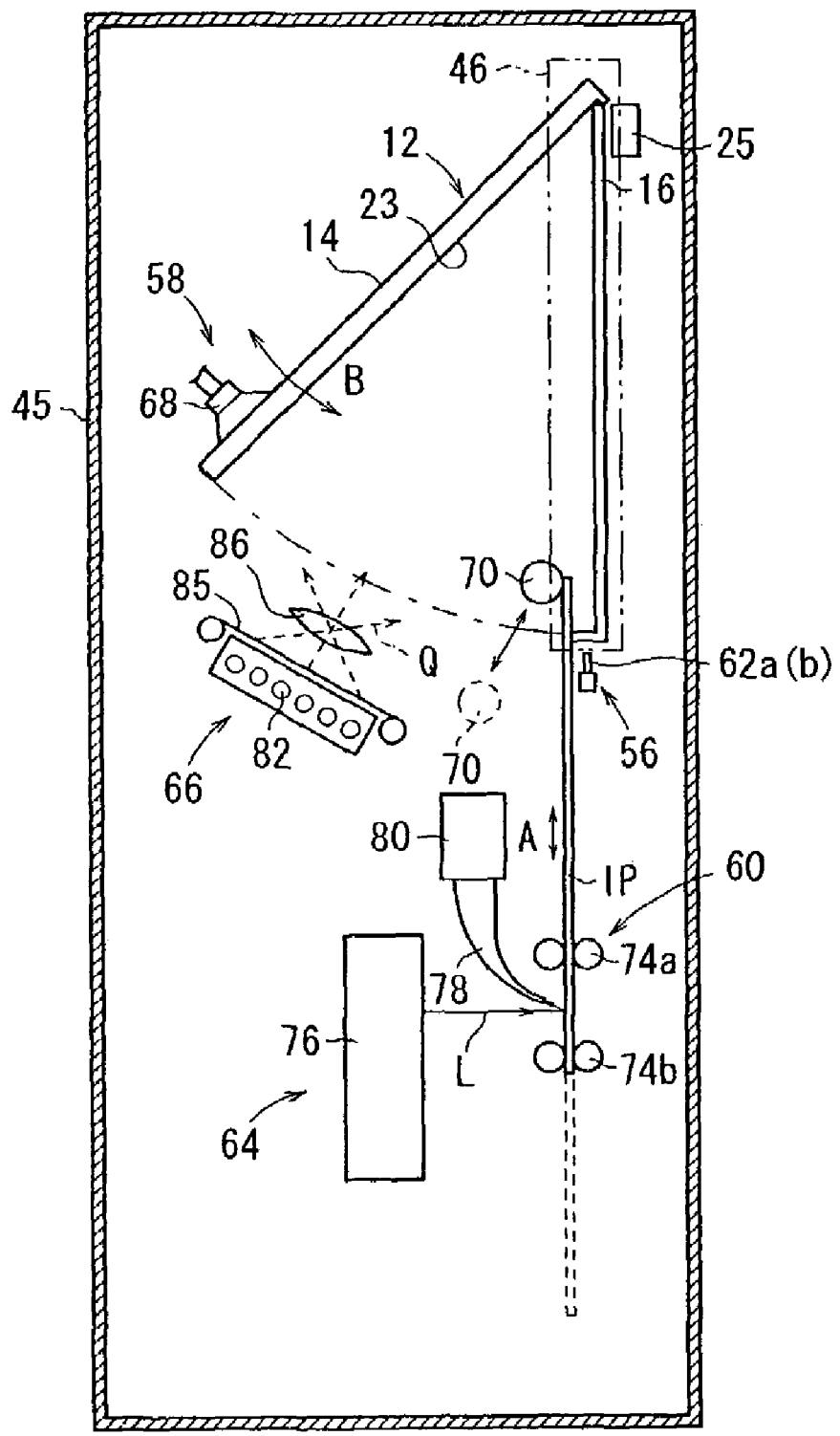
FIG. 2 is a cross-sectional view showing internal structures of the radiation image information reading and erasing apparatus illustrated in FIG. 1.
Figure 3:
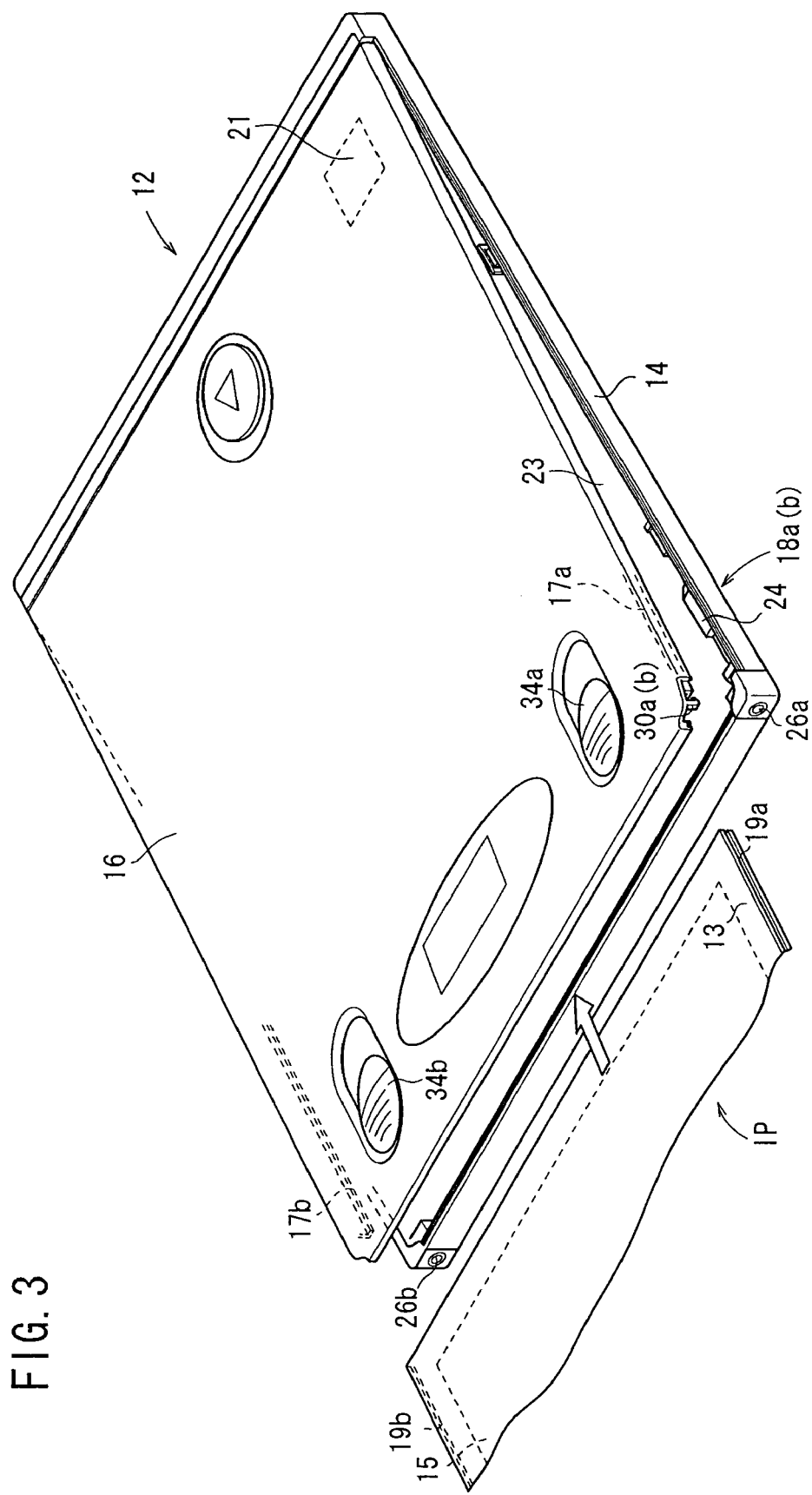
FIG. 3 is a perspective view of a cassette to be loaded into the radiation image information reading and erasing apparatus illustrated in FIG. 1.

FIG. 1 shows in perspective a radiation image information reading and erasing apparatus 10 according to an embodiment of the present invention, FIG. 2 shows in cross section internal structures of the radiation image information reading and erasing apparatus 10, and FIG. 3 shows in perspective a cassette 12 to be loaded into the radiation image information reading and erasing apparatus 10.

The radiation image information reading and erasing apparatus 10 shown in FIGS. 1 and 2 removes a stimulable phosphor sheet IP from the cassette 12 shown in FIG. 3, reads recorded radiation image information from the stimulable phosphor sheet IP, stores the stimulable phosphor sheet IP back into the cassette 12, erases remaining radiation image information from the stimulable phosphor sheet IP stored in the cassette 12, and then discharges the stimulable phosphor sheet IP together with the cassette 12 out of the radiation image information reading and erasing apparatus 10.

The stimulable phosphor sheet IP is a hard sheet comprising a support base 13 made of a hard material such as glass or the like and a columnar stimulable phosphor layer 15 evaporated on the support base 13. The stimulable phosphor layer 15 may be formed by a vacuum evaporation process, a sputtering process, a CVD process, or an ion plating process by which a stimulable phosphor is evaporated with heat and deposited on the support base 13 within a vacuum container. The stimulable phosphor layer 15 comprises a plurality of phosphor bodies in the form of columns substantially perpendicular to the plane of the stimulable phosphor sheet IP and optically independent of each other. Therefore, the stimulable phosphor layer 15 is highly sensitive to a radiation that is applied thereto and is effective to reduce the granularity of an image recorded thereon and reduce the scattering of stimulating light for clear image quality. The stimulable phosphor sheet IP is not limited to the hard sheet having the stimulable phosphor layer 15 deposited on the hard support base 13, but may be a flexible stimulable phosphor sheet comprising a flexible support base coated with a stimulable phosphor layer.

The cassette 12 has a housing (first holding member) 14 for housing the stimulable phosphor sheet IP therein and a lid (second holding member) 16 openably and closably hinged on the housing 14. Guide rails 17a, 17b for engaging and holding the stimulable phosphor sheet IP are disposed on opposite inner sides of the lid 16. The stimulable phosphor sheet IP has a pair of grooves 19a, 19b defined in opposite side edges thereof for engaging the guide rails 17a, 17b, respectively. The stimulable phosphor sheet IP is held on the lid 16 by the guide rails 17a, 17b which engage respectively in the grooves 19a, 19b. The lid 16 carries a memory medium 21 such as an IC chip or the like which stores information about the recording of radiation image information on the stimulable phosphor sheet IP, using a technology known as RFID (Radio Frequency Identification) or the like. The recording information stored by the memory medium 21 can be read when the cassette 12 is loaded into the radiation image information reading and erasing apparatus 10.

Figure 4:
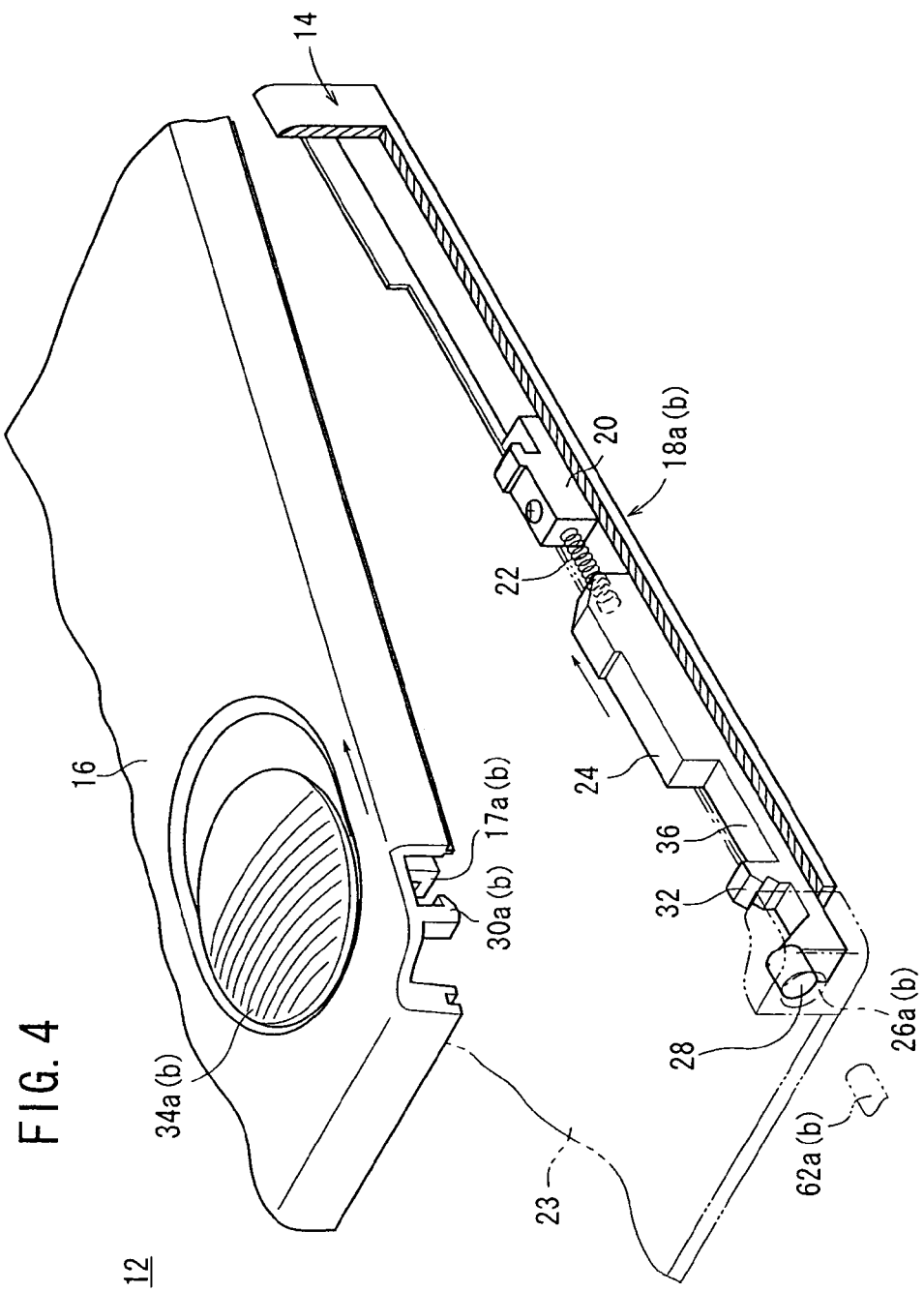
FIG. 4 is a perspective view of a lock mechanism in the cassette shown in FIG. 3.

The housing 14 has an inner surface serving as a reflecting surface 23 for efficiently reflecting erasing light to be described later. The reflecting surface 23 may comprise a glossy surface of metal for passing therethrough a radiation applied to the stimulable phosphor sheet IP or a white coating surface for diffusively reflecting erasing light. Lock mechanisms 18a, 18b shown in FIG. 4 are disposed on the respective opposite sides of an opening defined in the housing 14 through which the stimulable phosphor sheet IP can be inserted into the housing 14.

Each of the lock mechanisms 18a, 18b has a slider 24 slidably mounted on the housing 14 for movement toward and away from a support block 20 secured to the housing 14. The slider 24 is normally urged to move away from the support block 20 by a spring 22 acting between the slider 24 and the support block 20. The slider 24 has a presser pin 28 inserted in each of holes 26a, 26b that are defined in respective corners on the opposite sides of the housing 14. The slider 24 also has a lock finger 32 for engaging each of teeth 30a, 30b on the lid 16. When the slider 24 is slid toward the support block 20, the lock finger 32 disengages from each of the teeth 30a, 30b, releasing the lid 16 from the housing 14. The lid 16 has unlocking knobs 34a, 34b that can manually be moved by the operator in the direction indicated by the arrow to displace the slider 24. The unlocking knobs 34a, 34b have respective engaging members (not shown) each engaging a step 36 of the slider 24.

As shown in FIG. 1, the radiation image information reading and erasing apparatus 10 includes a casing 45 having a loading slot (loading unit) 46 defined in a front panel thereof for loading the cassette 12 with the stimulable phosphor sheet IP housed therein in an upstanding posture therethrough. The loading slot 46 has an openable/closable door 48 for keeping the interior of the casing 45 shielded against entry of light. A display console 50 for displaying various items of information including an operating state of the radiation image information reading and erasing apparatus 10 and also for the operator to enter various control actions, is disposed on the front panel of the casing 45 on one side of the loading slot 46. An operator authentication sensor 52 for reading a fingerprint, an iris, or another biometric pattern of the operator is disposed on the front panel of the casing 45 below the display console 50. The operator authentication sensor 52 serves to make the radiation image information reading and erasing apparatus 10 accessible only by certain authorized people for increased security.

As shown in FIG. 2, the casing 45 houses therein a reader 25 for reading the recording information from the memory medium 21 mounted on the lid 16 of the cassette 12 which has been loaded through the loading slot 46. An opening/closing mechanism 58 for selectively opening and closing the lid 16 of the loaded cassette 12 is disposed in an upper portion of the casing 45. A feed mechanism (feeding means)

60 for removing the stimulable phosphor sheet IP from the cassette 12 and feeding the stimulable phosphor sheet IP in the auxiliary scanning direction indicated by the arrow A is also disposed in the casing 45 below the loading slot 46. Specifically, the feed mechanism 60 extends between a vertically central position and a lower position in the casing 45. A reading unit 64 for reading the recorded radiation image information from the stimulable phosphor sheet IP is disposed in the casing 45 closely to the feed mechanism 60. An erasing unit 66 for erasing remaining radiation image information from the stimulable phosphor sheet IP is disposed in the casing 45 above the reading unit 64.

The opening/closing mechanism 58 has a suction cup 68 for attracting the housing 14 of the cassette 12, the suction cup 68 being displaceable in the direction indicated by the arrow B of FIG. 2. The opening/closing mechanism 58 may have a magnet, instead of the suction cup 68, if the housing 14 is made of a magnetic material. Alternatively, the opening/closing mechanism 58 may comprise a mechanism for mechanically engaging and displacing the housing 14.

An unlocking mechanism 56 for unlocking the lock mechanisms 18a, 18b of the cassette 12 is disposed in the casing 45 beneath the loading slot 46. As shown in FIG. 4, the unlocking mechanism 56 has pins 62a, 62b insertable into the respective holes 26a, 26b in the housing 14 of the cassette 12 for moving the sliders 24 toward the support blocks 20.

In FIG. 2, the feed mechanism 60 has a shiftable roller 70 for selectively removing the stimulable phosphor sheet IP from the lid 16 of the cassette 12 and setting the stimulable phosphor sheet IP on the lid 16, and feed rollers 74a, 74b for gripping the stimulable phosphor sheet IP taken from the cassette 12 and feeding the removed stimulable phosphor sheet IP in the auxiliary scanning direction indicated by the arrow A. The shiftable roller 70 can be shifted into and out of the cassette 12 in the directions indicated by the arrow so that the shiftable roller 70 will not interfere with the lid 16 as it is opened and closed.

The reading unit 64 has a stimulating optical system 76 for applying a laser beam L to scan the stimulable phosphor sheet IP in the main scanning direction, which is perpendicular to the auxiliary scanning direction, while the stimulable phosphor sheet IP is being fed by the feed mechanism 60 in the auxiliary scanning direction indicated by the arrow A, and a photoelectric transducer 80 comprising a photomultiplier or the like for detecting light that is emitted from the stimulable phosphor sheet IP as it is scanned by the laser beam L, through a light guide 78.

Figure 5:
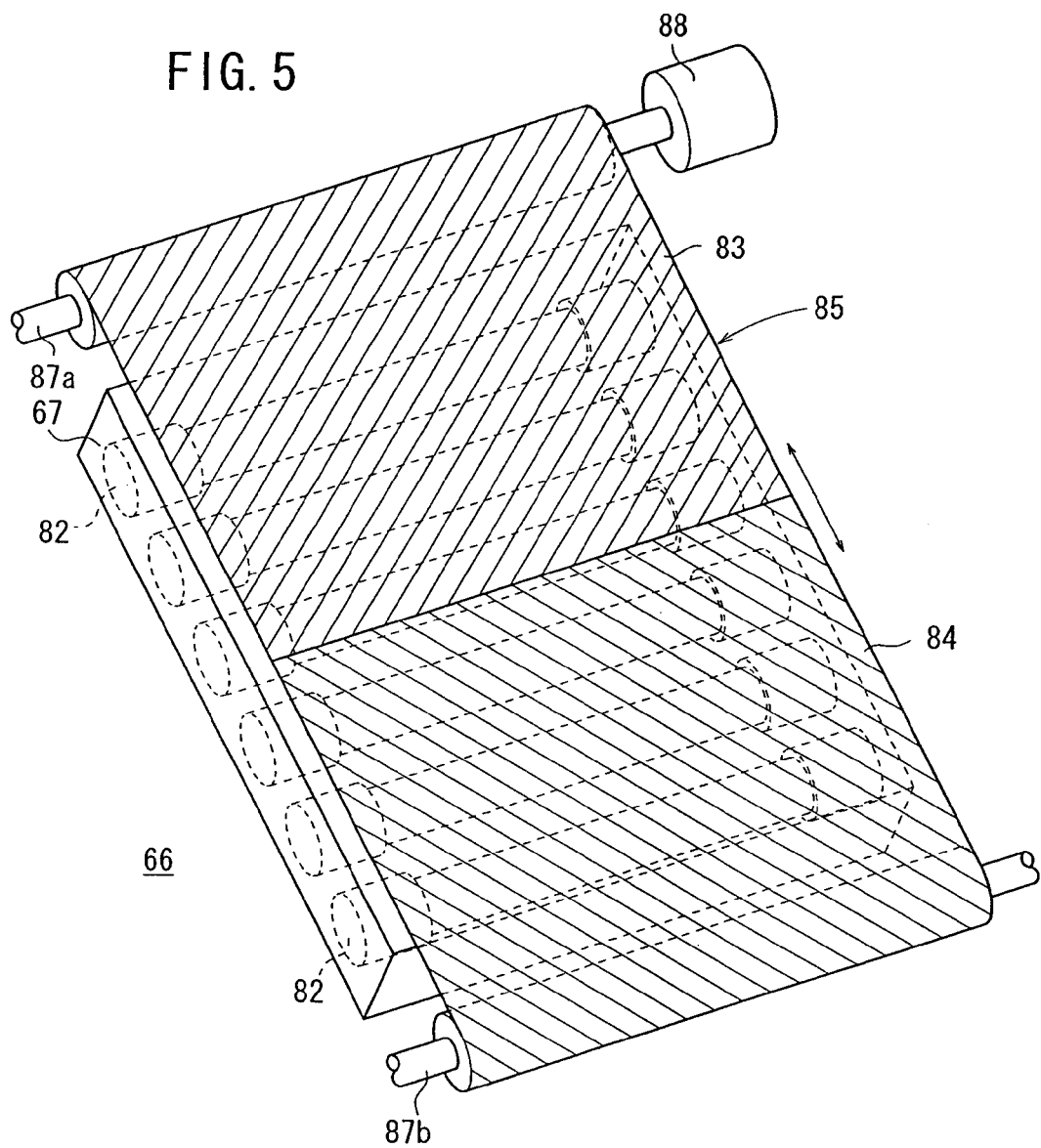
FIG. 5 is a perspective view of an erasing unit of the radiation image information reading and erasing apparatus illustrated in FIG. 1.

As shown in FIG. 5, the erasing unit 66 has a plurality of erasing light sources 82 such as cold-cathode tubes or the like housing in a casing 67 for applying erasing light Q to the stimulable phosphor sheet IP from which the recorded radiation image information has been read, a filter assembly 85 including a first filter 83 and a second filter 84 disposed on a front side of the erasing light sources 82 from which the erasing light Q is emitted, for selectively passing UV-included light or UV-removed light therethrough, and a condensing lens 86 (see FIG. 2) for converging and applying the erasing light Q that has passed through the first filter 83 or the second filter 84 to the stimulable phosphor sheet IP in the cassette 12. The first filter 83 and the second filter 84 are joined end to end, and wound around takeup rollers 87a, 87b, respectively. One of the first filter 83 and the second filter 84 at a time can be moved to a position over the front side of the erasing light sources 82 by a motor 88 which is coupled to the takeup roller 87a. Each of the erasing light sources 82 may comprise a sodium lamp, an HID (High Intensity Discharge) lamp, a xenon lamp, a halogen lamp, a mercury lamp, an LED, or the like.

The radiation image information reading and erasing apparatus 10 is basically constructed as described above. Operation of the radiation image information reading and erasing apparatus 10 will be described below.

First, prior to being introduced into and processed by the radiation image information reading and erasing apparatus 10, the stimulable phosphor sheet IP stored in the cassette 12 is irradiated with a radiation that has passed through a subject such as a human being and the housing 14, thereby recording radiation image information of the subject therein. At this time, the memory medium 21 on the cassette 12 stores recording information including the dose of the applied radiation, the recording date, the subject ID, etc.

Then, the operator follows guidance information displayed on the display console 50 to make itself authenticated by the operator authentication sensor 52, and loads the cassette 12 housing the stimulable phosphor sheet IP with the recorded radiation image information into the loading slot 46.

When the cassette 12 loaded through the loading slot 46 is detected, the reader 25 is energized to read the recording information from the memory medium 21 on the lid 16, and the unlocking mechanism 56 is actuated to insert the pins 62a, 62b into the respective holes 26a, 26b in the housing 14. As shown in FIG. 4, upon insertion of the pins 62a, 62b into the respective holes 26a, 26b, the sliders 24 are displaced toward the support blocks 20, causing the lock fingers 32 to disengage from the teeth 30a, 30b on the lid 16, which is now unlocked from the housing 14.

Then, the opening/closing mechanism 58 is actuated to cause the suction cup 68 to attract the housing 14 and displace the housing 14 in the direction indicated by the arrow B in FIG. 2, thereby opening the cassette 12 in the radiation image information reading and erasing apparatus 10. At this time, the stimulable phosphor sheet IP remains positioned on the lid 16 by the guide rails 17a, 17b that engage respectively in the grooves 19a, 19b defined in the opposite side edges of the stimulable phosphor sheet IP.

The shiftable roller 70 of the feed mechanism 60 is brought into abutment against the stimulable phosphor sheet IP on the lid 16, and is rotated to remove the stimulable phosphor sheet IP from the cassette 12. The shiftable roller 70 may be held in contact with the support base 13 on the opposite sides of the stimulable phosphor layer 15 for removing the stimulable phosphor sheet IP from the cassette 12 without causing damage to the stimulable phosphor layer 15.

The stimulable phosphor sheet IP removed from the cassette 12 is then gripped by the feed rollers 74a, 74b, and fed thereby downwardly in the auxiliary scanning direction indicated by the arrow A. The stimulating optical system 76 of the reading unit 64 is energized to emit the laser beam L as stimulating light. The laser beam L is applied to scan the stimulable phosphor sheet IP in the main scanning direction while the stimulable phosphor sheet IP is being fed by the feed mechanism 60 in the auxiliary scanning direction indicated by the arrow A. Therefore, the stimulable phosphor sheet IP is two-dimensionally scanned by the laser beam L.

When irradiated with the laser beam L, the stimulable phosphor sheet IP emits light in proportion to the recorded radiation image information. The emitted light is guided by the light guide 78 to the photoelectric transducer 80, which converts the light into a corresponding electric signal.

The reading unit 64 is disposed immediately below the loading slot 46, and the lid 16 of the cassette 12 serves as part of a supporting mechanism for supporting the stimulable phosphor sheet IP while it is being fed by the feed mechanism 60 and read by the reading unit 64. Consequently, the distance over which the stimulable phosphor sheet IP is fed by the feed mechanism 60 is kept to a minimum, and the stimulable phosphor sheet IP can be fed and read stably without being subjected to undue vibrations.

After the recording radiation image information is read by the reading unit 64, the stimulable phosphor sheet IP is fed back upwardly by the feed mechanism 60, and stored back into the cassette 12 by the shiftable roller 70.

Then, the erasing unit 66 is energized to turn on the erasing light sources 82. The erasing light Q emitted from the erasing light sources 82 is directly applied to the stimulable phosphor sheet IP through the condensing lens 86, reflected by the reflecting surface 23 of the housing 14, and applied again to the stimulable phosphor sheet IP, thereby erasing remaining radiation image information from the stimulable phosphor sheet IP. At this time, the amount of the erasing light Q to be applied to the stimulable phosphor sheet IP is controlled based on the recording information read from the memory medium 21 to efficiently erase remaining radiation image information from the stimulable phosphor sheet IP with a minimum amount of erasing light required.

In erasing remaining radiation image information from the stimulable phosphor sheet IP, the motor 88 is energized to position the first filter 83 for passing UV light over the front side of the erasing light sources 82, and the erasing unit 66 is energized. Then, the motor 88 is energized again to position the second filter 84 for removing UV light over the front side of the erasing light sources 82, and the erasing unit 66 is energized. In this manner, remaining radiation image information can efficiently be erased from the stimulable phosphor sheet IP. Rather than using the filter assembly 85 shown in FIG. 5, the erasing unit 66 may have a first group of erasing light sources 82 for emitting UV-included light and a second group of erasing light sources 82 for emitting UV-removed light, and may selectively turn on the first and second groups of erasing light sources 82 for erasing remaining radiation image information from the stimulable phosphor sheet IP.

The erasing unit 66 of the present embodiment is capable of erasing remaining radiation image information from the stimulable phosphor sheet IP while the stimulable phosphor sheet IP is being stored in the cassette 12. Therefore, no space needs to be provided for positioning the erasing unit 66 between the loading slot 46 and the reading unit 64, and the radiation image information reading and erasing apparatus 10 can be reduced in size accordingly.

After the recorded radiation image information is read from the stimulable phosphor sheet IP while the stimulable phosphor sheet IP is being fed downwardly, the erasing light Q may start being applied to the stimulable phosphor sheet IP to erase remaining radiation image information therefrom simultaneously when the stimulable phosphor sheet IP starts being fed upwardly. In this manner, the time required to erase remaining radiation image information from the stimulable phosphor sheet IP is shortened even more. The erasing unit 66 may select some of the erasing light sources 82 to be turned on depending on the size of the stimulable phosphor sheet IP stored in the loaded cassette 12 for thereby erasing remaining radiation image information from the stimulable phosphor sheet IP with a minimum amount of erasing light Q. The erasing light sources 82 may be replaced with a heating member for emitting infrared rays for applying heat energy as erasing energy to the stimulable phosphor sheet IP to erase remaining radiation image information therefrom.

After remaining radiation image information is erased from the stimulable phosphor sheet IP by the erasing unit 66, the shiftable roller 70 is retracted out of the cassette 12. Then, the suction cup 68 of the opening/closing mechanism 58 is displaced toward the lid 16 in the direction indicated by the arrow B until the housing 14 is engaged by the lid 16. Thereafter, the cassette 12 is unloaded from the casing 45 through the loading slot 46, and will be used to record radiation image information in a next cycle.

Figure 6:
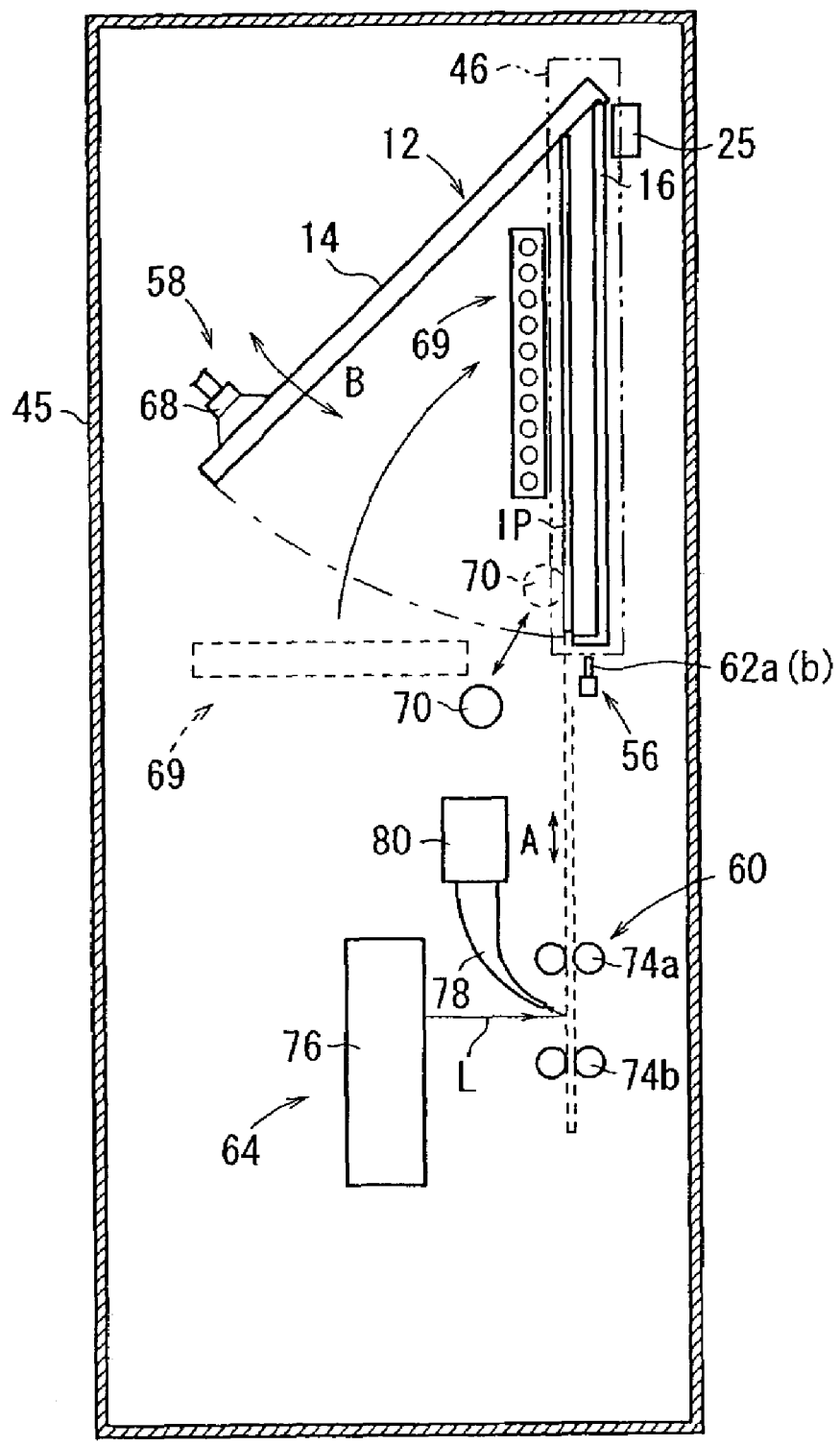
FIG. 6 is a cross-sectional view showing internal structures of a modification of the radiation image information reading and erasing apparatus illustrated in FIG. 2.
Figure 7:
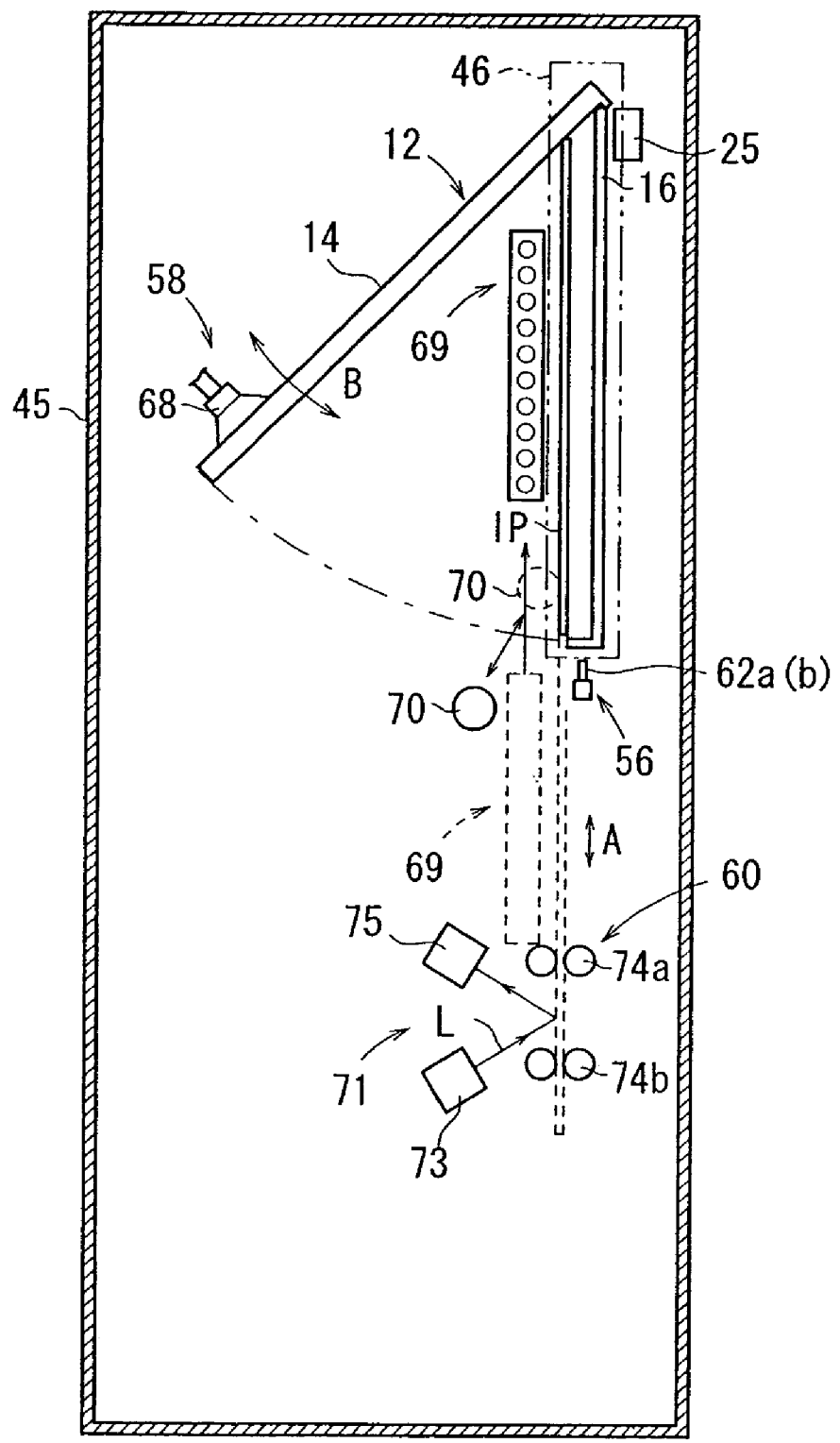
FIG. 7 is a cross-sectional view showing internal structures of another modification of the radiation image information reading and erasing apparatus illustrated in FIG. 2.

According to the present embodiment, the erasing unit 66 is fixed in a position above the reading unit 64. However, as shown in FIG. 6, an erasing unit (two-dimensional erasing means) 69 may be angularly moved from the position above the reading unit 64 into the cassette 12. Alternatively, as shown in FIG. 7, the erasing unit 69 may be linearly displaced from the position above a reading unit 71 into the cassette 12. With this modification, no condensing lens needs to be provided in the erasing unit 69, and the housing 14 needs no inner reflecting surface. Therefore, the radiation image information reading and erasing apparatus 10 is simpler in structure.

The area that can be irradiated at one time with the erasing light by the erasing unit 69 may not necessarily cover the entire surface of the stimulable phosphor sheet IP, but may cover a portion of the entire surface of the stimulable phosphor sheet IP. For example, the erasing unit 69 may erase remaining radiation image information from the stimulable phosphor sheet IP while the erasing unit 69 is moving along the stimulable phosphor sheet IP, or may erase remaining radiation image information from the stimulable phosphor sheet IP when the erasing unit 69 moves successively to a plurality of divided regions of the entire surface of the stimulable phosphor sheet IP.

As shown in FIG. 7, the reading unit 71 has a stimulating light source 73 comprising a plurality of semiconductor lasers or the like arrayed in the main scanning direction, and a line sensor 75 such as a CCD sensor or the like for detecting light that is emitted from the stimulable phosphor sheet IP in response to the laser beam L applied thereto from the stimulating light source 73 and converting the emitted light into an electric signal. The reading unit 71 thus constructed makes the radiation image information reading and erasing apparatus 10 further smaller in size.

Figure 8:
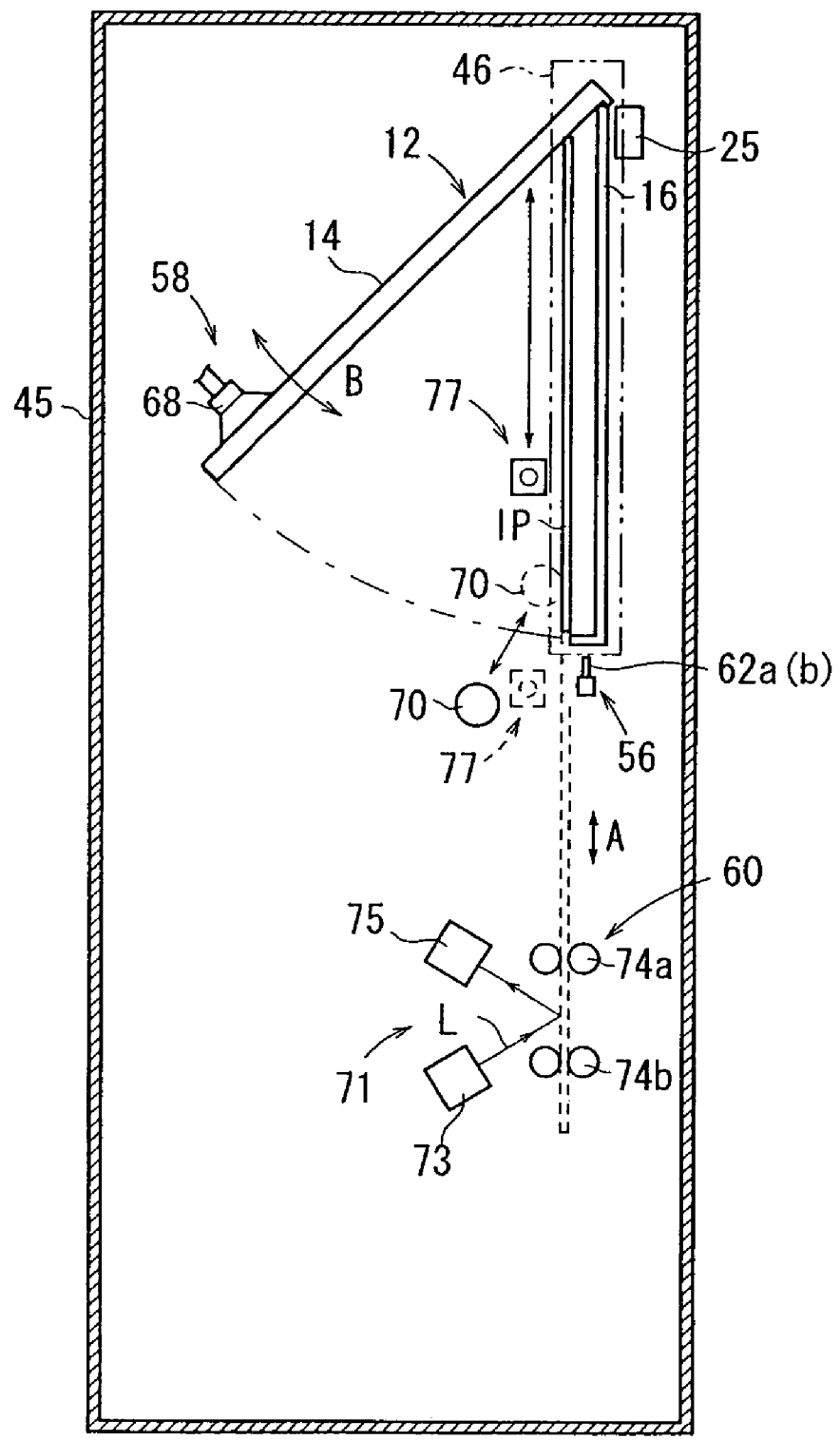
FIG. 8 is a cross-sectional view showing internal structures of still another modification of the radiation image information reading and erasing apparatus illustrated in FIG. 2.

Further alternatively, as shown in FIG. 8, an erasing unit 77 may comprise a linear illuminating source that is elongate in the main scanning direction, and may be moved from the reading unit 71 in the auxiliary scanning direction indicated by the arrow A along the stimulable phosphor sheet IP in the cassette 12.

Figure 9:
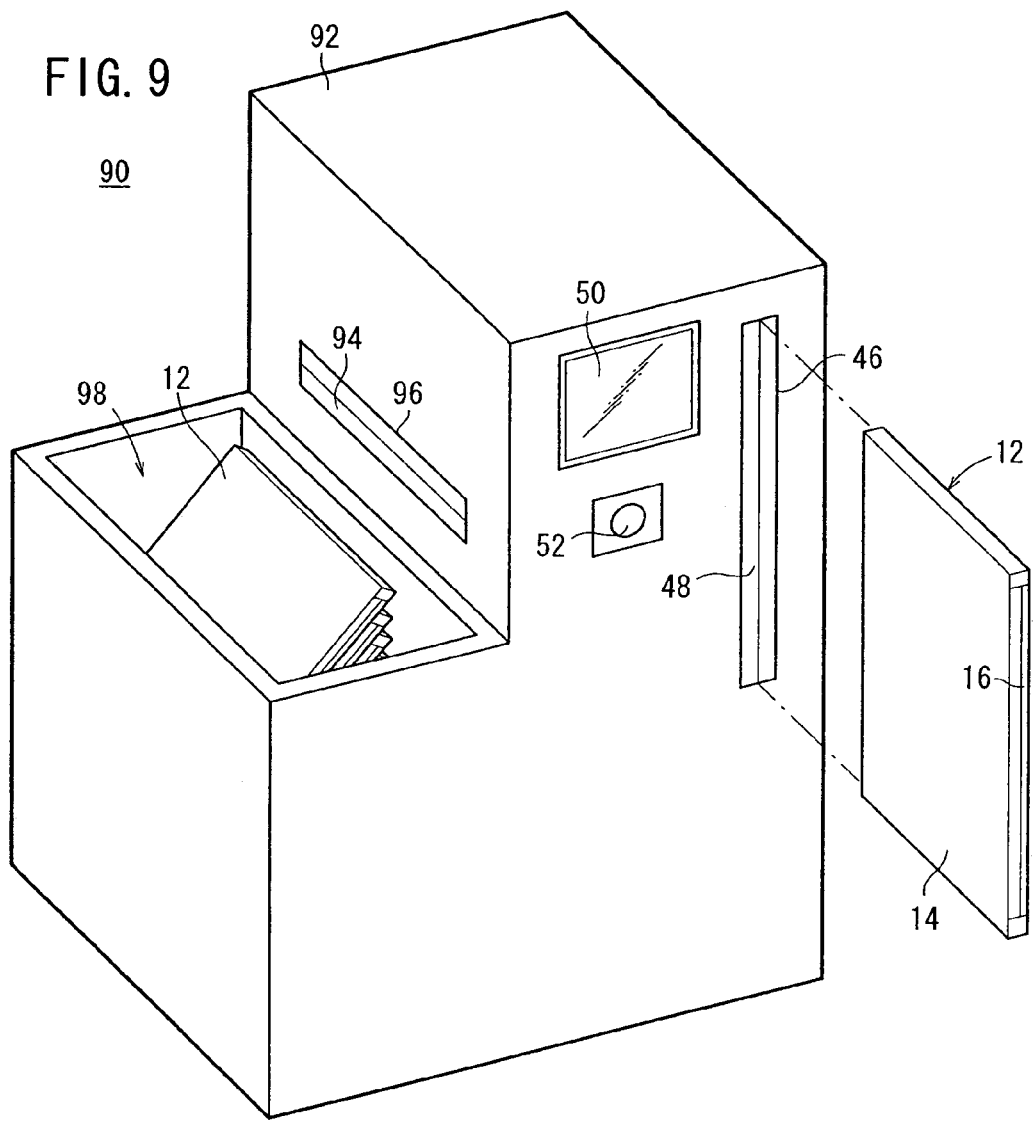
FIG. 9 is a perspective view of a radiation image information reading and erasing apparatus according to another embodiment of the present invention.
Figure 10:
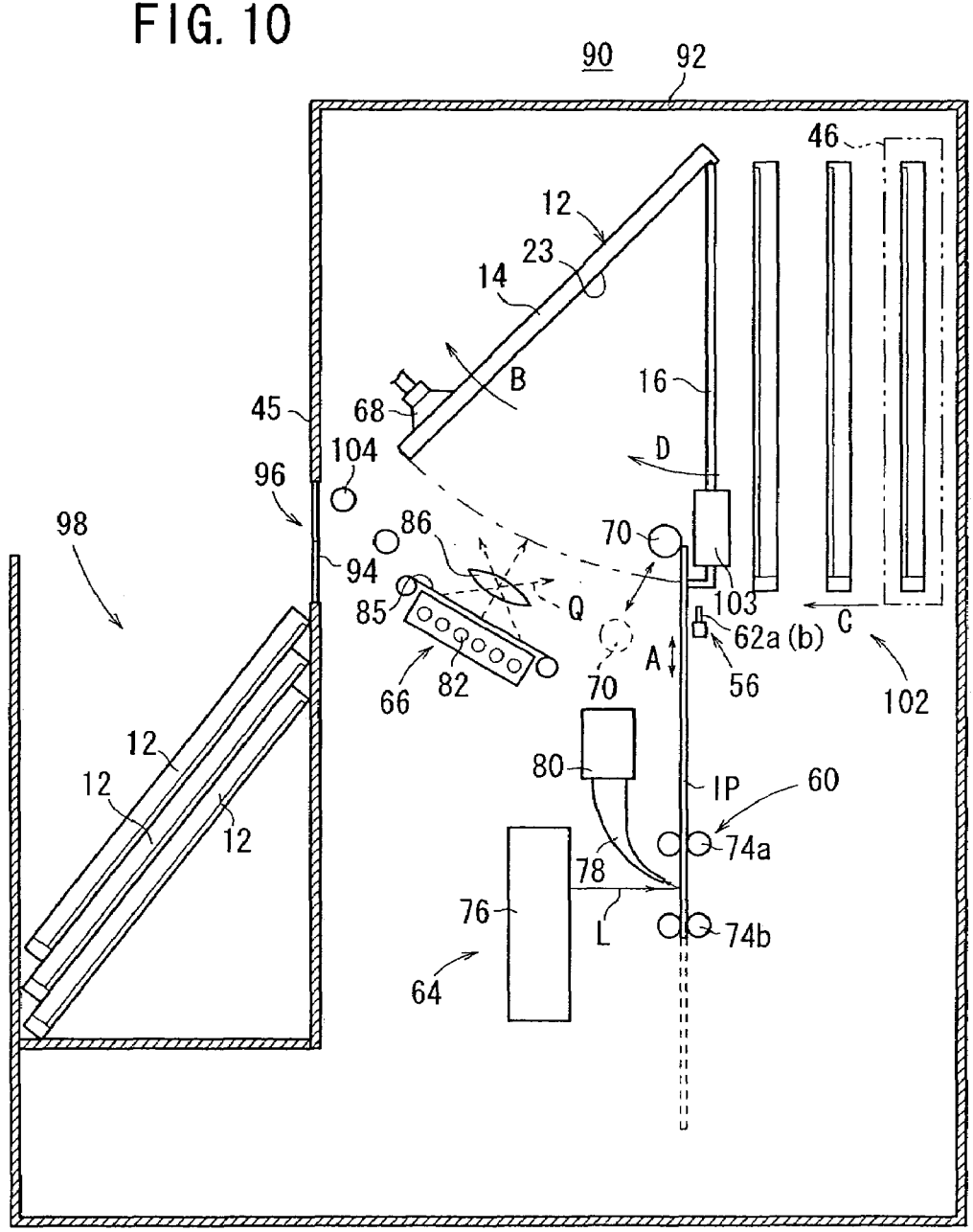
FIG. 10 is a cross-sectional view showing internal structures of the radiation image information reading and erasing apparatus illustrated in FIG. 9.

A radiation image information reading and erasing apparatus 90 according to another embodiment of the present invention shown in FIGS. 9 and 10 will be described below. Those parts of the radiation image information reading and erasing apparatus 90 which are identical to the radiation image information reading and erasing apparatus 10 shown in FIGS. 1 and 2 are denoted by identical reference characters, and will not be described in detail below.

The radiation image information reading and erasing apparatus 90 includes a casing 92 having the loading slot (loading unit) 46 defined in the front panel thereof for loading the cassette 12 therethrough. The casing 92 also has an unloading slot (unloading unit) 96 defined in a side panel thereof for unloading the cassette 12 therethrough. The unloading slot 96 has an openable/closable door 94. The radiation image information reading and erasing apparatus 90 also has a cassette storage unit 98 disposed adjacent to and outside of the casing 92 below the unloading slot 96 for storing cassettes 12 that are unloaded from the unloading slot 96.

The casing 92 houses therein a stacking unit 102 for storing four cassettes 12 in an upstanding posture. The stacking unit 102 extends from the loading slot 46 to a region where a cassette 12 is opened and closed. The stacking unit 102 has a feed mechanism (not shown) for successively feeding cassettes 12 that are loaded from the loading slot 46 in the direction indicated by the arrow C in FIG. 10.

An opening/closing mechanism for selectively opening and closing the cassette 12 has the suction cup 68 for attracting the housing 14 of the cassette 12 and displacing the housing 14 in the direction indicated by the arrow B, and a turning mechanism 103 for angularly moving the lid 16 of the cassette 12 in the direction indicated by the arrow D. Unloading rollers 104 are disposed near the unloading slot 96 for discharging the cassette 12 into the cassette storage unit 98. The unloading rollers 104 are specifically positioned near the lower end of the cassette 12 which is closed when the lid 16 is angularly moved by the turning mechanism 103 in the direction indicated by the arrow D.

The radiation image information reading and erasing apparatus 90 operates as follows: The cassette 12 loaded through the loading slot 46 is stored in the stacking unit 102, and then fed by the non-illustrated feed mechanism in the direction indicated by the arrow C to a position above the reading unit 64.

Then, the unlocking mechanism 56 unlocks the lock mechanisms 18a, 18b of the cassette 12, and the housing 14 of the cassette 12 is attracted and moved by the suction cup 68 in the direction indicated by the arrow B, thus opening the cassette 12. Thereafter, the shiftable roller 70 removes the stimulable phosphor sheet IP from the cassette 12. The stimulable phosphor sheet IP is fed by the feed mechanism 60 in the direction indicated by the arrow A. Then, the reading unit 64 reads the recorded radiation image information from the stimulable phosphor sheet IP.

After the recorded radiation image information is read from the stimulable phosphor sheet IP, the stimulable phosphor sheet IP is stored back into the cassette 12. Thereafter, or at the same time that the stimulable phosphor sheet IP is stored back into the cassette 12, the erasing unit 66 is energized to apply erasing light Q to the cassette 12, erasing remaining radiation image information from the stimulable phosphor sheet IP.

Then, the shiftable roller 70 is retracted out of the cassette 12. Thereafter, the lid 16 of the cassette 12 is held by the turning mechanism 103 and angularly moved in the direction indicated by the arrow D to engage the housing 14, thereby closing the cassette 12.

The closed cassette 12 is gripped by the unloading rollers 104 and discharged through the unloading slot 96 into the cassette storage unit 98.

The stacking unit 102 stores a plurality of cassettes 12. Cassettes 12 that have been processed are successively discharged and stored in the cassette storage unit 98. Therefore, the radiation image information reading and erasing apparatus 90 is capable of successively processing a plurality of cassettes 12. In the present embodiment, the erasing unit 66 and the reading unit 64 may be modified in the same manner as the modifications shown in FIGS. 6 through 8.

Figure 11:
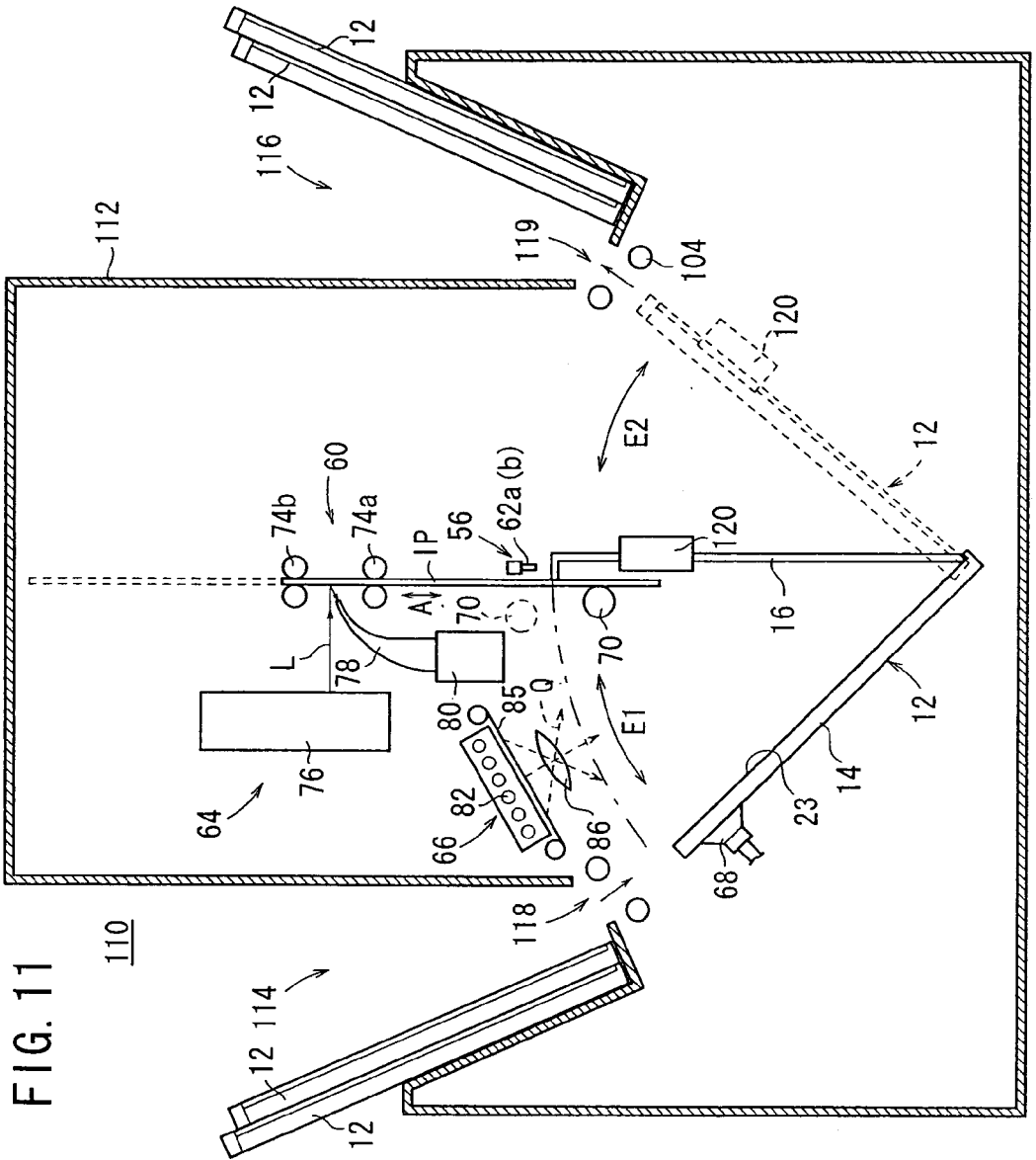
FIG. 11 is a cross-sectional view showing internal structures of a radiation image information reading and erasing apparatus according to still another embodiment of the present invention.

A radiation image information reading and erasing apparatus 110 according to still another embodiment of the present invention shown in FIG. 11 will be described below. Those parts of the radiation image information reading and erasing apparatus 110 which are identical to the radiation image information reading and erasing apparatus 10 shown in FIGS. 1 and 2 are denoted by identical reference characters, and will not be described in detail below.

The radiation image information reading and erasing apparatus 110 includes a casing 112 having a loading unit 114 on a side panel thereof for loading the cassette 12 therein, and an unloading unit 116 on another side panel thereof for unloading the cassette 12 therein.

The casing 112 houses therein an opening/closing mechanism having the suction cup 68 movable in an angular range indicated by the arrow E1 for attracting and opening/closing the housing 14 of a cassette 12 which is supplied from a loading slot 118 of the loading unit 114, and a turning mechanism 120 angularly movable in an angular range indicated by the arrow E2 for holding and angularly moving the lid 16 of the cassette 12 and guiding the cassette 12 to an unloading slot 119 of the unloading unit 116. The erasing unit 66 is disposed between the loading unit 114 and the reading unit 64.

The radiation image information reading and erasing apparatus 110 operates as follows: After the cassette 12 is supplied from the loading slot 118 of the loading unit 114 into the casing 112, the housing 14 of the cassette 12 is attracted by the suction cup 68 and angularly moved in the direction indicated by the arrow E1, so that the cassette 12 is positioned in an upstanding posture directly below the reading unit 64. Then, the lid 16 is unlocked by the unlocking mechanism 56, and the suction cup 68 is moved toward the loading unit 114, thereby opening the cassette 12 as shown in FIG. 11.

Then, the shiftable roller 70 removes the stimulable phosphor sheet IP from the cassette 12, and feeds the removed stimulable phosphor sheet IP in the direction indicated by the arrow A to the reading unit 64, which reads the recorded radiation image information from the stimulable phosphor sheet IP.

After the recording radiation image information is read by the reading unit 64, the stimulable phosphor sheet IP is stored back into the cassette 12 by the shiftable roller 70. Thereafter, or at the same time that the stimulable phosphor sheet IP is stored back into the cassette 12 by the shiftable roller 70, the stimulable phosphor sheet IP in the cassette 12 that remains open is irradiated with the erasing light Q from the erasing unit 66 to erase remaining radiation image information from the stimulable phosphor sheet IP.

Then, the shiftable roller 70 is retracted out of the cassette 12. Thereafter, the suction cup 68 is moved toward the lid 16 to cause the housing 14 to engage the lid 16, thus closing the cassette 12. Thereafter, the lid 16 of the cassette 12 is held by the turning mechanism 120, which is moved in the direction indicated by the arrow E2 to angularly move the cassette 12 with the stimulable phosphor sheet IP stored therein toward the unloading unit 116. The unloading rollers 104 grip the cassette 12, and discharge the cassette 12 through the unloading slot 119 into the unloading unit 116. In the present embodiment, the erasing unit 66 and the reading unit 64 may also be modified in the same manner as the modifications shown in FIGS. 6 through 8.

Figure 12:
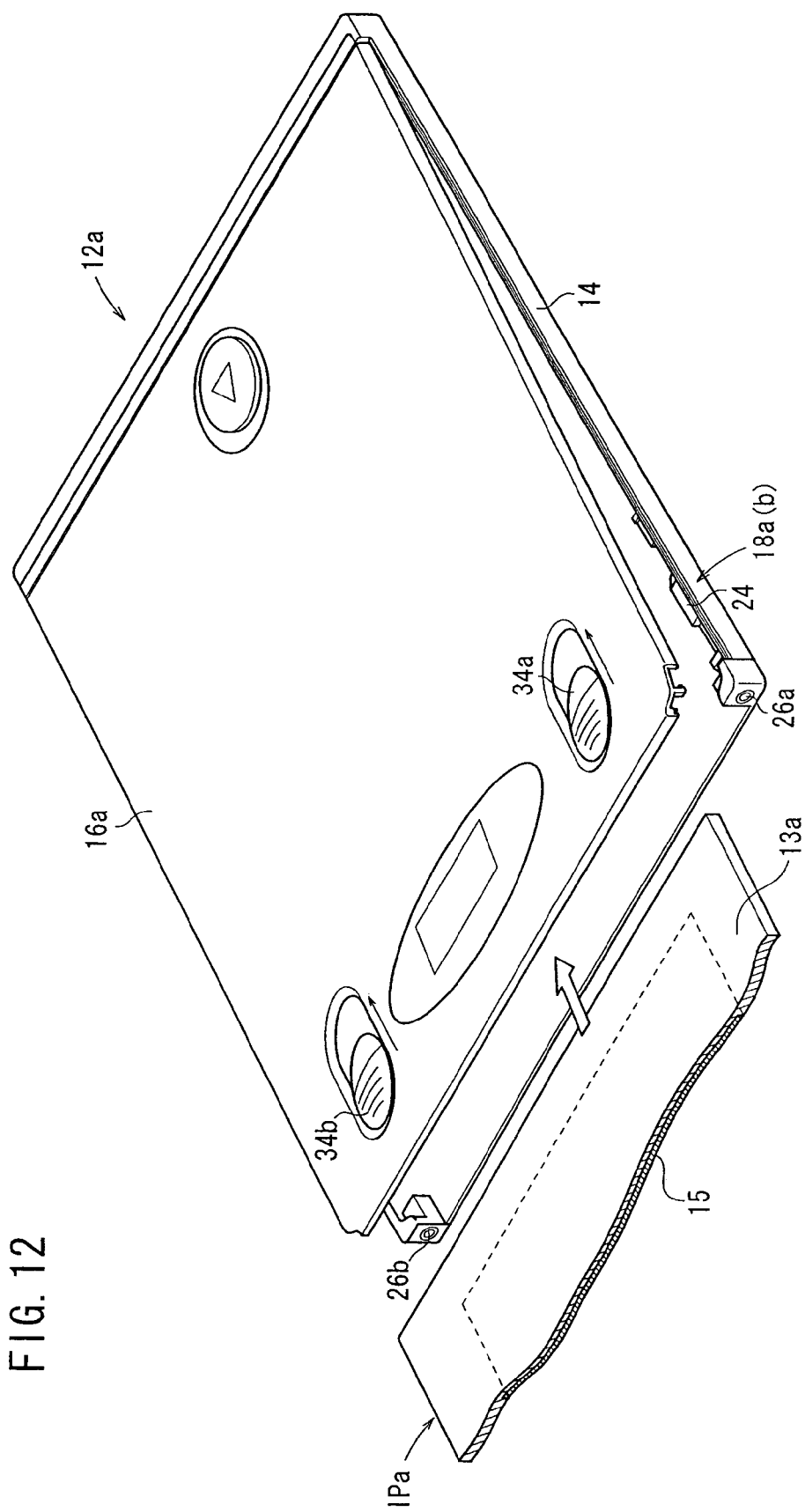
FIG. 12 is a perspective view of a cassette to be loaded into a radiation image information reading and erasing apparatus according to yet another embodiment of the present invention.

In each of the above embodiments, as shown in FIG. 3, the recorded radiation image information is read and the remaining radiation image information is erased while the stimulable phosphor sheet IP is being held on the lid 16 of the cassette 12. However, as shown in FIG. 12, the recorded radiation image information may be read and the remaining radiation image information may be erased while a stimulable phosphor sheet IPa is being held in the housing 14 of a cassette 12*a*. The stimulable phosphor sheet IPa shown in FIG. 12 has a support base 13*a* made of a transparent material for passing the erasing light Q therethrough. The cassette 12*a* has a lid 16*a* having the inner surface as the reflecting surface 23.

Figure 13:
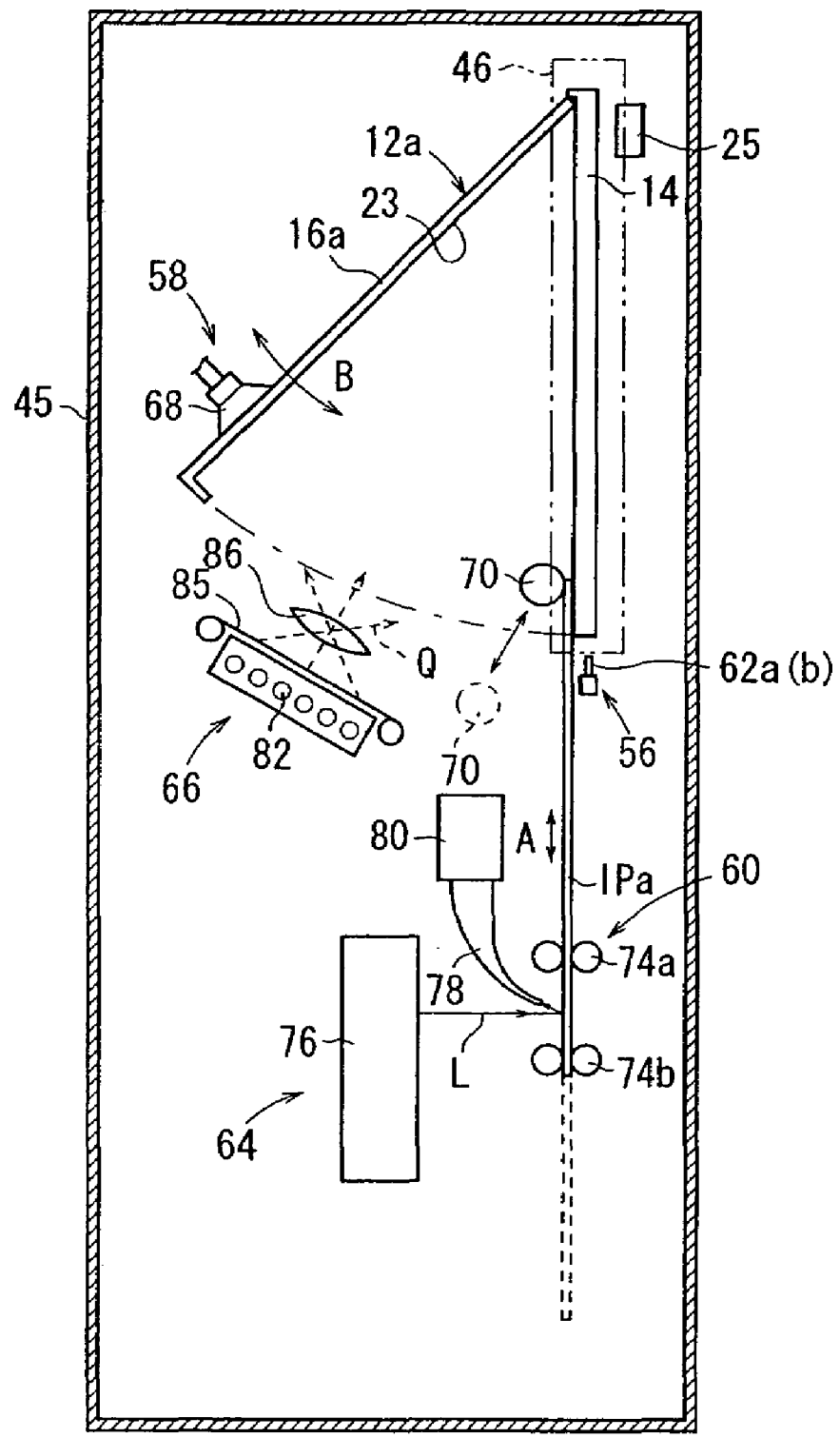
FIG. 13 is a cross-sectional view showing internal structures of the radiation image information reading and erasing apparatus which is loaded with the cassette shown in FIG. 12.
Figure 14:
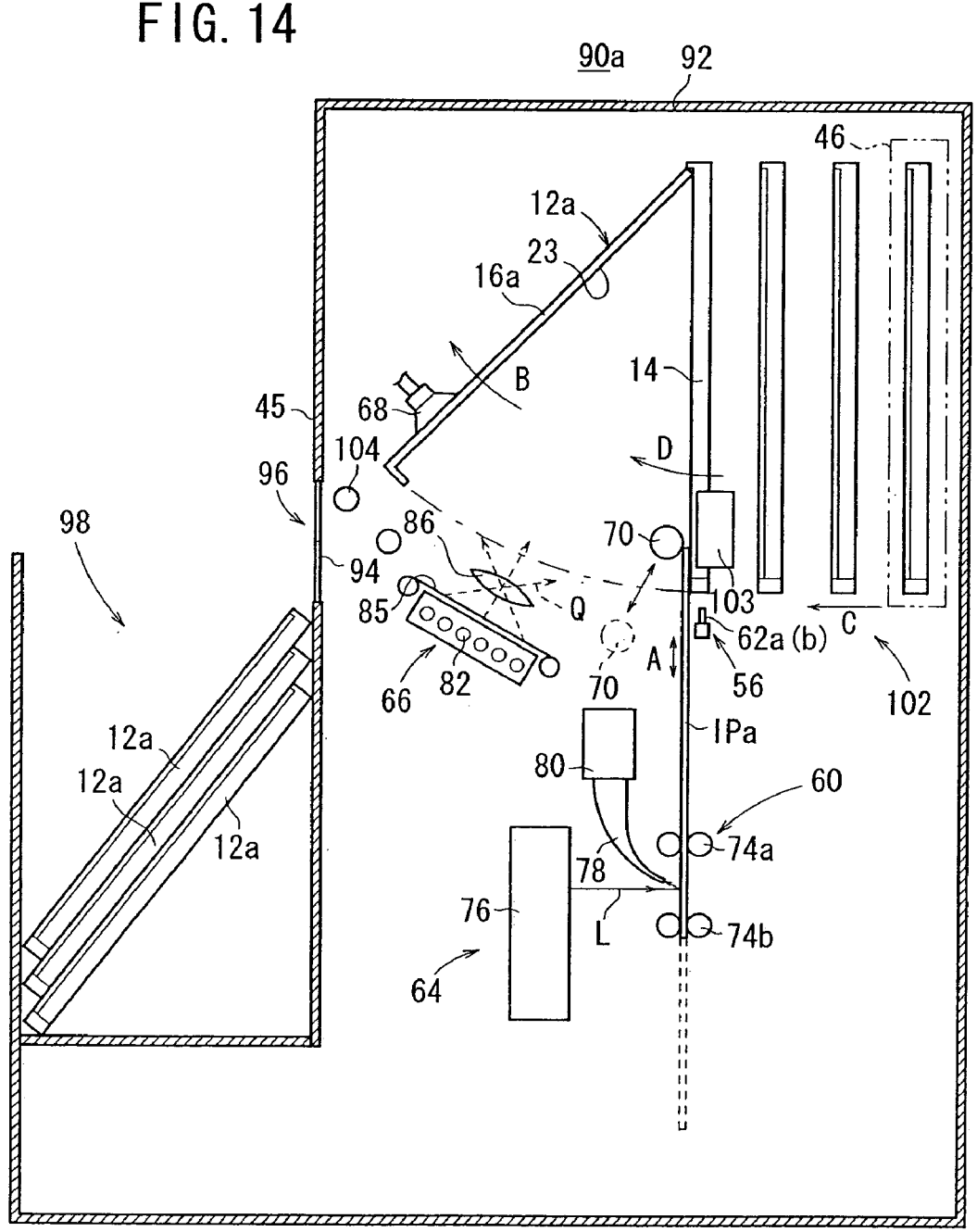
FIG. 14 is a cross-sectional view showing internal structures of a radiation image information reading and erasing apparatus, which is loaded with the cassette shown in FIG. 12, according to yet still another embodiment of the present invention.
Figure 15:
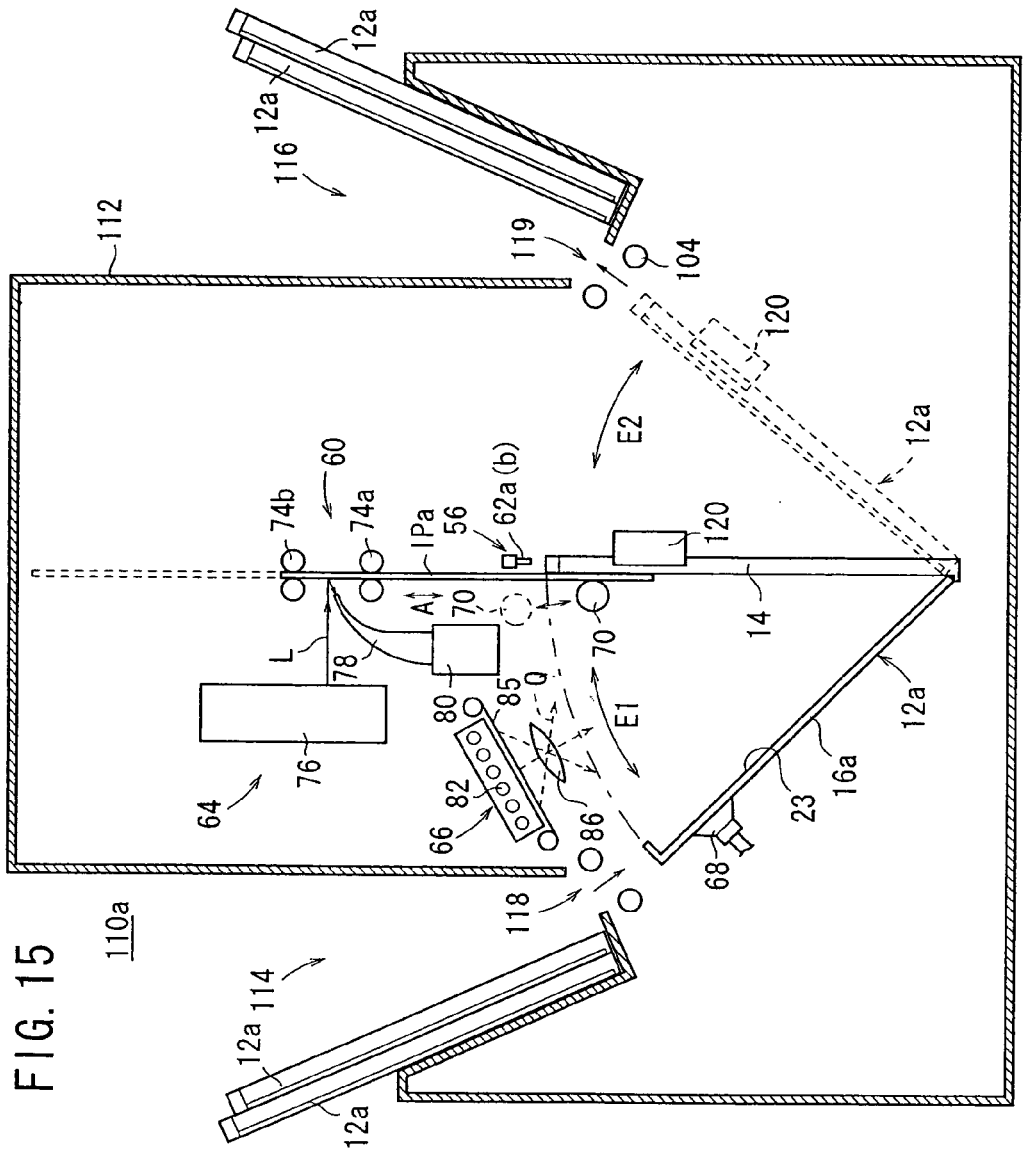
FIG. 15 is a cross-sectional view showing internal structures of a radiation image information reading and erasing apparatus, which is loaded with the cassette shown in FIG. 12, according to a further embodiment of the present invention.

FIG. 13 shows a radiation image information reading and erasing apparatus 10*a* which is a modification of the radiation image information reading and erasing apparatus 10 shown in FIG. 2 for processing the cassette 12*a*. FIG. 14 shows a radiation image information reading and erasing apparatus 90*a* which is a modification of the radiation image information reading and erasing apparatus 90 shown in FIG. 10 for processing the cassette 12*a*. FIG. 15 shows a radiation image information reading and erasing apparatus 110*a* which is a modification of the radiation image information reading and erasing apparatus 110 shown in FIG. 11 for processing the cassette 12*a*.

In the radiation image information reading and erasing apparatus 10*a*, 90*a*, 110*a*, after the lid 16*a* of the cassette 12*a* is attracted and opened by the suction cup 68, the stimulable phosphor sheet IPa is removed from the housing 14 and fed to the reading unit 64, which reads the recorded radiation image information from stimulable phosphor sheet IPa through the support base 13*a*. After the recorded radiation image information is read from the stimulable phosphor sheet IPa, the stimulable phosphor sheet IPa is stored in the housing 14 of the cassette 12*a*, and the erasing light Q is applied through the support base 13*a* to the stimulable phosphor sheet IPa to erase remaining radiation image information therefrom.

In the radiation image information reading and erasing apparatus 10*a*, 90*a*, 110*a*, the erasing unit 66 and the reading unit 64 may also be modified in the same manner as the modifications shown in FIGS. 6 through 8.

Although certain preferred embodiments of the present invention have been shown and described in detail, it should be understood that various changes and modifications may be made therein without departing from the scope of the appended claims.

What is claimed is:

1. An apparatus for applying stimulating light to a stimulable phosphor sheet on which radiation image information has been recorded, photoetectrically reading light emitted from said stimulable phosphor sheet to acquire said recorded radiation image information therefrom, and applying erasing energy to said stimulable phosphor sheet to erase remaining radiation image information therefrom, said apparatus comprising:

a loading unit for loading a cassette holding said stimulable phosphor sheet between a first holding member and a second holding member;

an opening/closing mechanism for opening and closing one of said first holding member and said second holding member with respect to the other;

feeding means for removing said stimulable phosphor sheet from said cassette opened by said opening/closing mechanism and feeding said stimulable phosphor sheet in an auxiliary direction;

a reading unit for applying stimulating light to scan said stimulable phosphor sheet in a main direction while said stimulable phosphor sheet is being fed by said feeding means, and reading light which is emitted from said stimulable phosphor sheet upon exposure to said stimulating light, thereby reading recorded radiation image information from said stimulable phosphor sheet; and an erasing unit for applying erasing energy to said stimulable phosphor sheet in said cassette opened by said opening/closing mechanism to erase remaining radiation image information from said stimulable phosphor sheet.

2. An apparatus according to claim 1, further comprising:

a stacking unit for holding at least one said cassette loaded by said loading unit; and an unloading unit for unloading said cassette which stores said stimulabie phosphor sheet from which said remaining radiation image information is erased by said erasing unit.

3. An apparatus according to claim 1, further comprising:

an unloading unit for unloading said cassette which stores said stimulable phosphor sheet from which said remaining radiation image information is erased by said erasing unit; and a turning mechanism for turning said cassette to said unloading unit.

4. An apparatus according to claim 1, wherein said erasing unit is disposed closely to an opening of said cassette which is opened by said opening/closing mechanism, for applying erasing light to said stimulable phosphor sheet to erase said remaining radiation image information from said stimulable phosphor sheet.

5. An apparatus according to claim 1, wherein said erasing unit is movable into said cassette which is opened by said opening/closing mechanism.

6. An apparatus according to claim 5, wherein said erasing unit comprises two-dimensional erasing means for two-dimensionally applying said erasing energy to said stimulable phosphor sheet.

7. An apparatus according to claim 5, wherein said erasing unit comprises one-dimensional erasing means for one-dimensionally applying said erasing energy to said stimulable phosphor sheet, said one-dimensional erasing means being movable along said stimulable phosphor sheet for two-dimensionally applying said erasing energy to said stimulable phosphor sheet.

8. An apparatus according to claim 1, wherein said cassette has an inner surface formed as a reflecting surface for reflecting said erasing energy applied by said erasing unit.

9. An apparatus according to claim 1, wherein said erasing unit has a first filter for passing UV-included light therethrough and a second filter for passing UV-removed light therethrough, said erasing unit being arranged to apply erasing light through said first filter to said stimulable phosphor sheet to erase said remaining radiation image information from said stimulable phosphor sheet and thereafter to apply erasing light through said second filter to said stimulable phosphor sheet to erase said remaining radiation image information from said stimulable phosphor sheet.

10. An apparatus according to claim 1, wherein said loading unit is arranged to load said cassette in an upstanding posture, and said feeding means is arranged to feed said stimulable phosphor sheet vertically to said reading unit.

11. An apparatus according to claim 1, wherein said stimulable phosphor sheet includes a support base for passing said erasing energy therethrough, and wherein said reading unit is arranged to read said radiation image information of said stimulable phosphor sheet through a surface thereof remote from said support base, and said erasing unit is arranged to erase said remaining radiation image information from said stimulable phosphor sheet through said support base.

12. The apparatus of claim 1, wherein the loading feeding means removes said stimulable phosphor sheet in a substantially vertical direction for reading in a substantially vertical direction in the reading unit, with planar surfaces of the sheet disposed to face a direction perpendicular to ground.

13. The apparatus of claim 1, wherein the feeding means includes a shiftable roller, said shiftable roller disposed in a first position within a position of the cassette and a second position outside of the cassette.

14. The apparatus of claim 1, wherein the opening/closing mechanism moves one of the first and second holding members before and after read out.

15. A method of reading and erasing radiation image information, comprising the steps of:
 opening a cassette storing a stimulable phosphor sheet on which radiation image information has been recorded;
 removing said stimulable phosphor sheet from said cassette and reading recorded radiation image information from said stimulable phosphor sheet;
 storing said stimulable phosphor sheet, from which said recorded radiation image information has been read, into said cassette;
 applying erasing energy to said stimulable phosphor sheet in said cassette to erase remaining radiation image information from said stimulable phosphor sheet; and
 closing said cassette storing said stimulable phosphor sheet from which said remaining radiation image information has been erased.

16. A method according to claim 15, wherein said step of applying erasing energy to said stimulable phosphor sheet comprises the steps of moving an erasing unit into said cassette which has been opened and applying said erasing energy from said erasing unit to said stimulable phosphor sheet to erase said remaining radiation image information therefrom.

17. The method of claim 15, wherein opening and closing the cassette are provided by a common open and close device.

18. The method of claim 15, wherein removing and reading the phosphor sheet are performed with the phosphor sheet oriented in a substantially vertical orientation with planar surfaces of the sheet disposed to face a direction perpendicular to ground.

* * * * *